(12) United States Patent
Speckbacher et al.

(10) Patent No.: US 6,445,456 B2
(45) Date of Patent: *Sep. 3, 2002

(54) PHOTOELECTRIC POSITION MEASURING DEVICE

(75) Inventors: Peter Speckbacher, Kirchweidach; Michael Allgäuer, Stein/Traun; Georg Flatscher, Schneizlreuth; Anton Sailer, Traunstein; Walburga Kern, Traunreut, all of (DE)

(73) Assignee: Dr. Johannas Heidenhain GmbH, Traunreut (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,140

(22) Filed: Dec. 16, 1997

(30) Foreign Application Priority Data

Dec. 17, 1996 (DE) .......................... 196 52 563

(51) Int. Cl.⁷ ................................................ G01B 9/02
(52) U.S. Cl. ................................. 356/499; 250/237 G
(58) Field of Search ................................ 356/356, 499, 356/521; 359/576, 572, 569, 575, 574, 566; 250/237 G

(56) References Cited

U.S. PATENT DOCUMENTS

| | | | |
|---|---|---|---|
| 4,222,633 A | * | 9/1980 | Hock ..................... 350/162 R |
| 5,007,709 A | | 4/1991 | Iida et al. |
| 5,101,102 A | | 3/1992 | Nishimura et al. |
| 5,333,048 A | | 7/1994 | Michel et al. |
| 5,424,833 A | * | 6/1995 | Huber et al. ................. 356/356 |
| 5,483,059 A | * | 1/1996 | Igaki et al. ............. 250/231.16 |
| 5,694,218 A | * | 12/1997 | Fukui et al. ................. 356/356 |
| 5,754,341 A | * | 5/1998 | Takata et al. ............... 359/569 |
| 5,907,436 A | * | 5/1999 | Perry et al. .................. 359/576 |
| 6,141,360 A | * | 10/2000 | Kinugawa et al. ............. 372/20 |

FOREIGN PATENT DOCUMENTS

| | | |
|---|---|---|
| DE | 37 06 277 | 9/1987 |
| DE | 43 29 626 | 3/1994 |
| DE | 43 29 627 | 3/1994 |
| DE | 43 03 975 | 8/1994 |
| DE | 44 24 565 | 8/1995 |
| EP | 0 590 163 | 4/1994 |
| EP | 0 591 832 | 4/1994 |
| EP | 0 741 282 | 11/1996 |

* cited by examiner

Primary Examiner—Frank G. Font
Assistant Examiner—Andrew H. Lee
(74) Attorney, Agent, or Firm—Brinks Hofer Gilson & Lione

(57) ABSTRACT

In a position measuring device, a scale is embodied as a phase grating on which several partial beams impinge and are diffracted and caused to interfere with each other in the scanning unit. The entry angle ($\alpha$) of the partial beams corresponds to the Littrow angle, so that the diffracted partial beams of ±1st diffraction order are diffracted at the same angle $\beta = \alpha$. The diffraction efficiency of the scale is particularly great if the flanks of the bars of the scales are at an angle of approximately 70° with respect to the measuring direction, i.e., if the bars and gaps are embodied to be trapezoidal in cross section.

21 Claims, 4 Drawing Sheets

PHOTOELECTRIC POSITION MEASURING DEVICE

FIELD OF THE INVENTION

The invention relates to a photoelectric position measuring device for measuring the position of two objects that are displaceable in relation to each other, and more particularly, a position measuring device having a scale embodied as a diffraction grating.

BACKGROUND OF THE INVENTION

Positioning measuring devices having scales that are embodied as a diffraction grating are known, for example, from German Patent Publication No. DE 43 03 975 A1 and U.S. Pat. No. 5,424,833.

SUMMARY OF THE INVENTION

It is an object of the invention to disclose a high-resolution photoelectric measuring device, whose scanning signals have a high degree of modulation and which is simple to construct.

An advantage of the position measuring device according to the present invention lies in that the degree of modulation is still very good even when a light source having a low output power is used. The employment of a light source of low output has the advantage that heating of the entire measuring device is reduced thereby increasing measurement accuracy and long term stability of the device. Another advantage of the present invention resides in that the permissible tolerances of parameters, such as the light wavelength of the light source, the graduation period and bar-gap ratio, as well as the step height of the diffraction grating, are relatively large.

The invention will be explained in more detail by means of the drawings.

DETAILED DESCRIPTION OF THE PRESENTLY PREFERRED EMBODIMENTS

Figure 1:
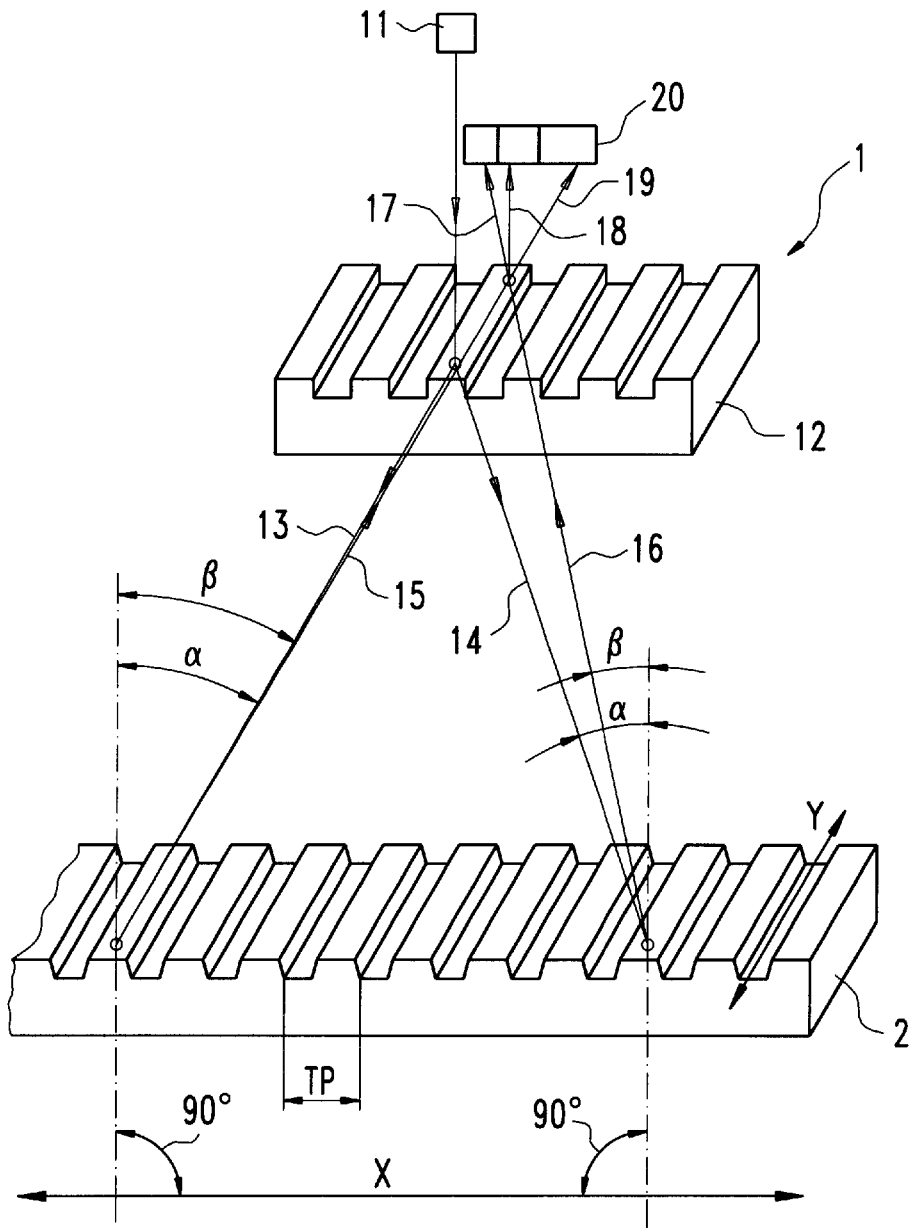
FIG. 1 is a schematic representation of a position measuring device according to a preferred embodiment of the present invention.

FIG. 1 is a schematic representation of a position measuring device according to a preferred embodiment of the present invention. The position measuring device includes a scanning unit 1 and a scale 2 which can be displaced in relation to the scanning unit in a measuring direction X. The scanning unit 1 is fastened on a first object and the scale 2 is fastened on a second object in order to measure the relative position of the two objects.

The scanning unit 1 includes a light source 11, a beam splitter 12 and detector 20. The light source 11 is preferably in the form of a semiconductor laser, whose light impinges on the beam splitter 12 and is split into two partial beams 13 and 14. In the preferred illustrated embodiment, the beam splitter 12 is a diffraction grating that diffracts the impinging light to create two partial beams 13 and 14, where partial beam 13 is of the −1st diffraction order, and partial beam 14 of the +1st diffraction order. The partial beams 13 and 14, separated from each other in the measuring direction X impinge on the scale 2 where they are again diffracted. In a preferred embodiment, the scale 2 is a diffraction grating in the form of a phase grating, which will be explained in more detail by with reference to FIGS. 3 through 6. The partial beam 13 is diffracted at the scale 2 into a −1st diffraction order 15, which exits at the same angle $\beta$ as which the partial beam 13 impinges on the scale 2. The entry angle is identified by the reference sign $\alpha$. The partial beam 14 is also diffracted at the scale 2 into a partial beam 16 of −1st diffraction order which exits at angle $\beta$ which is the same angle as the entry angle. The entry angle of beam 14 is also identified by the reference sign $\alpha$. The diffracted partial beams 15 and 16 of the same diffraction order interfere with each other at the beam splitter 12 to create partial beams 17, 18 and 19 impinge on the detector device 20 where they are converted to electrical measuring signals which are phase-shifted with respect to each other.

As can be seen from FIG. 1 the light of the laser 11 impinges on the beam splitter 12 at a point which is spaced perpendicularly with respect to the measuring direction X from the point where beams 15 and 16 interfere. Because of this measure the separation of the beams with a simple construction is ensured.

Thus, the partial beams 13 and 15 are located in a plane which is inclined by the angle $(90°-\beta)$ with relation to the surface of the scale 2, which is parallel to the measuring direction X. The same applies to the plane formed by partial beams 14 and 16. The relationship where $\alpha=\beta$ is also called the Littrow condition, wherein the angle $\alpha$ is called the Littrow angle. In connection with the Littrow condition, the intensity of the diffracted, P-polarized partial beams 15 and 16 is particularly high, and the design of the position measuring device particularly simple. This applies particularly if the graduation period TP of the scale 2 is approximately equal to or less than the light wavelength $\lambda$ of the laser 11. In this case the Littrow condition reads generally, $\alpha=\arcsin \lambda/2TP$. With $\lambda=670$ nm, TP=512 nm, $\alpha$ is approximately 40°.

The partial beams 13, 14 impinging on the phase grating 2 are linearly polarized, and the polarization is aligned in such a way that, if possible, the entire electrically polarized portion of the light lies in the plane of incidence (X-Y plane), i.e. is P-polarized. With regard to the phase grating 2, this light portion corresponds to the TM polarization, wherein the projection of this portion is oriented in the measuring direction X on the phase grating 2. This orientation of the polarization takes place by rotating the laser 11 and/or by the insertion of optical devices, which affect the polarization of the partial beams 13, 14 accordingly. So that the amplitudes of the measuring signals obtained from the detection device 20 are particularly high, the diffraction efficiency of the scale 2 must be great. In accordance with the invention, an optimization of this takes place, as will be explained hereinafter with reference to FIGS. 3 to 6.

Figure 2:
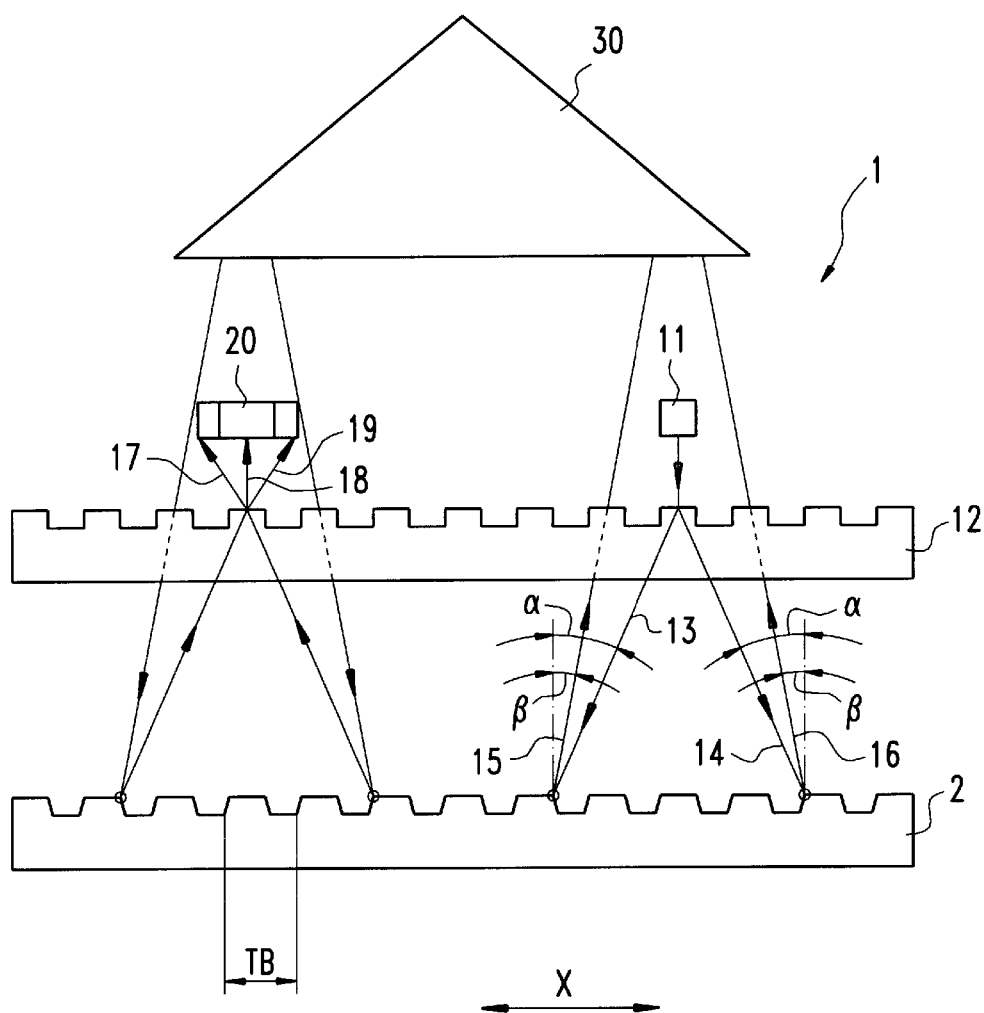
FIG. 2 is a schematic of a position measuring device according to a second preferred embodiment of the present invention.

FIG. 2 is a schematic of a position measuring device according to a second preferred embodiment of the present invention. The position measuring device includes a scale 2, a beam splitter 12, a laser 11, a detector device 20 and a deflection element 30. To a large degree the optical beam path corresponds to the embodiment shown in FIG. 1, but with the difference, that the partial beams 15 and 16 diffracted at the scale 2 are deflected by the deflection element 30, preferably, a triple prism, in such a way that the beams 15 and 16 impinge a second time on the scale 2 where they are again diffracted into +1st and −1st diffraction orders. It is only these partial beams that interfere at the beam splitter 12 and impinge on the detector device 20. Because of the double diffraction of the beams at the scale 2, measuring signals of a period of ¼ TP are obtained, i.e., double the resolution in comparison with the measuring device shown in FIG. 1. With this design it is also particularly advantageous if the Littrow condition is met for each of the four partial beams impinging on the scale 2, i.e. that the entry angle α at least approximately corresponds to the exit angle β. With this example it also applies that the scale 2 is a phase grating, whose graduation period TP is approximately equal to or less than the lightwave length λ of the laser 11. For reasons of clarity the beam path in the triple prism 30 has not been represented, and the partial beams which are not affected by the beam splitter 12 have been drawn in dashed lines in the area of the beam splitter 12.

Figure 3:
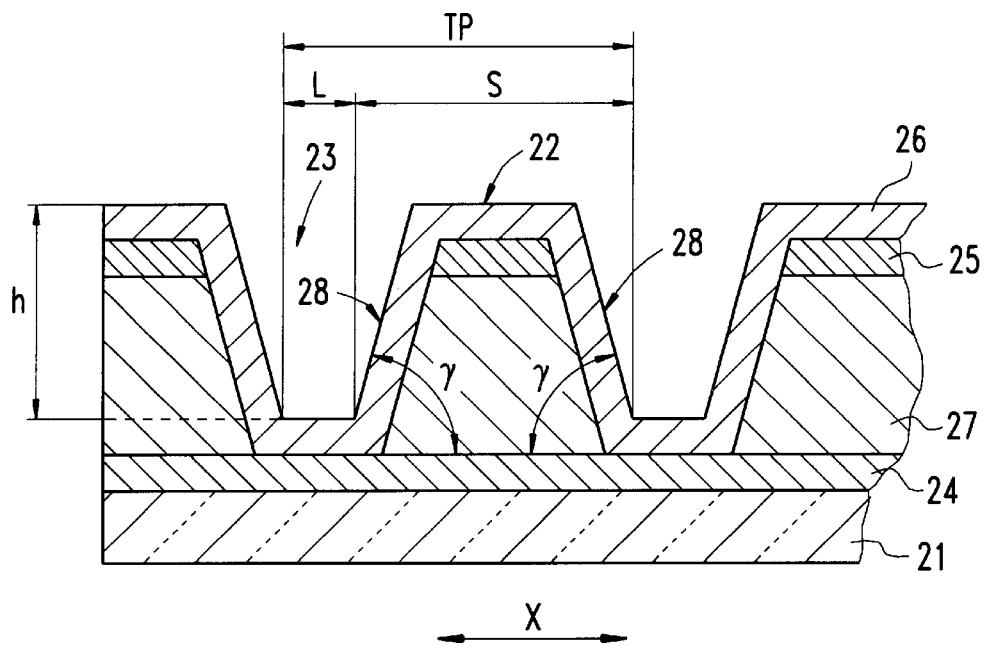
FIG. 3 is a cross-sectional view of a portion of a scale of the position measuring device shown in FIGS. 1 and 2.

FIG. 3 is a cross-sectional view of a portion of a scale of the position measuring device shown in FIGS. 1 and 2. The scale 2 includes a substrate 21 preferably formed of glass or ceramic glass having a relief structure. Disposed on the substrate 21 is a phase grating, preferably in the form of bars 22 and gaps 23. Each bar has inclined sides 28 flanks. In the formation of the scale shown in FIG. 3, continuous layer 24, for example chromium, is applied as an etching stop to the substrate 21. The bars 22 are preferably made of a dielectric 27, for example, silicon dioxide, titanium oxide, tantalum pentoxide or aluminum oxide. An etch-resistant layer 25, which, for example, consists of titanium oxide, is partially provided as a mask for etching the gaps 23. The entire structure is covered by a reflecting layer 26, which is an electrically conducting metal layer, preferably a chromium layer. The reflecting layer 26 can be deposited by sputtering.

The particular layer arrangement shown in FIG. 3 is only represented as an example. The substrate can also be a metal strip, wherein the layer 24 in particular then can be omitted. It is essential in connection with the phase grating in accordance with the invention, that the gaps 23, the bars 22 and the flanks 28 are reflecting.

In connection with known scale 2 used in photoelectric position measuring systems, gaps 23 were produced in such a way so that the flanks 28 of the bars 22 extended perpendicularly with respect to the measuring direction X. According to the present invention, it has been found that the diffraction efficiency is particularly large if each flank 28 is inclined at an angle γ not equal to 90°. Accordingly a scale 2 of a position measuring device shown in FIGS. 1 and 2 with a phase grating with bars which are symmetrical and trapezoidal in shape has a particularly large diffraction efficiency.

Figure 4:
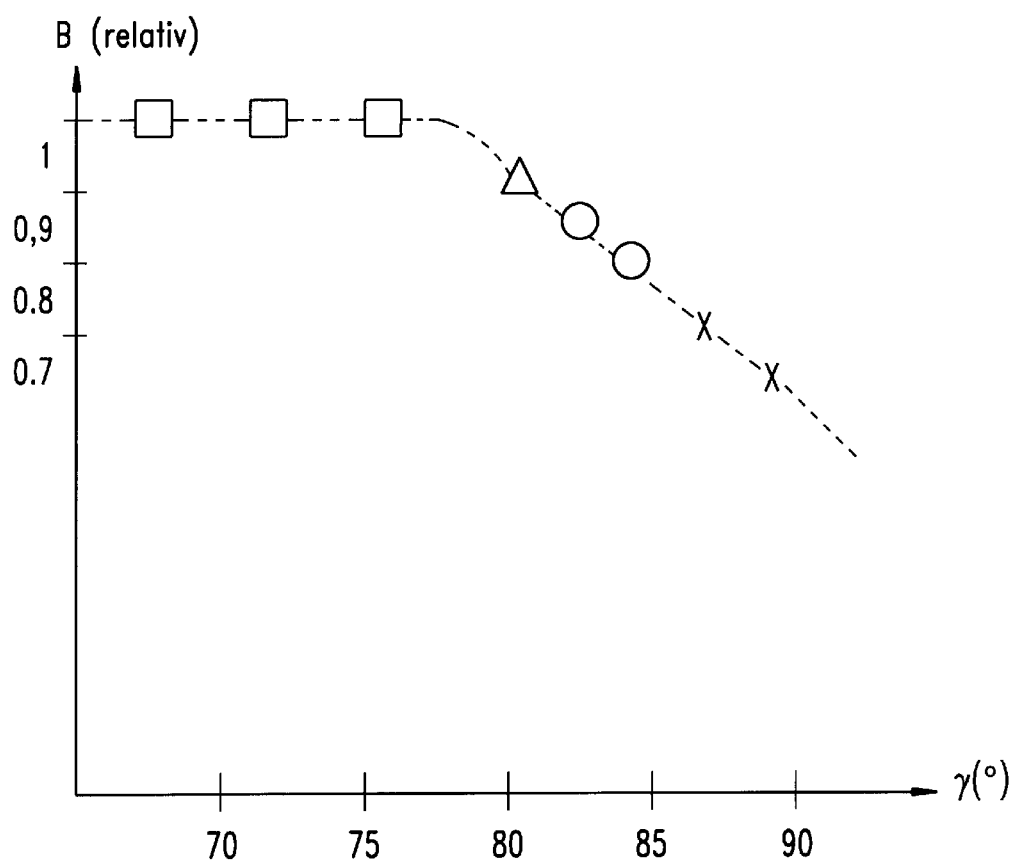
FIG. 4 is a graph of the diffraction efficiency of a scale as a function of the flank angle of the bars of the scale.

FIG. 4 is a graph of the diffraction efficiency of scale as a function of the flank angle of the bars of a scale. The diffraction efficiency B of the transversal magnetic mode TM has been plotted as a function of the flank angle γ of the bars 22. This progression was proven by a series of tests. A particularly good diffraction efficiency for first diffraction orders 15, 16 is obtained at a flank angle γ of less than 80°. This flank angle of less than 80°, in particular 70°±10°, can be achieved utilizing dry or wet etching methods.

Crystalline silicon in particular is suitable as the material used to create the steps 27 wherein the flank angle γ can be set by the crystal orientation, for example, by a wet etching method. The position of the relief structure to be etched with respect to the crystal orientation determines the flank angle γ. If a 110-silicon wafer is used as the material for the scale 2, and if the gaps 23 are etched parallel with the crystal orientation (crystal orientation=Y direction), a flank angle γ of 67° results because of the different etching rates in the different crystal orientation. Therefore the required flank angle γ results particularly exactly and reproducibly with this anisotropic etching of a 110-Si wafer, in particular using potassium hydroxide (KOH). The etched surface (bars, gaps and flanks) of the silicon is subsequently coated with a reflecting and electrically conducting layer 26. Use of other semiconductor crystals, for example germanium (Ge) or gallium arsenide (GaAs) is also possible.

The phase grating 2 embodied according to the present invention can also be produced using embossing methods where the relief structure is directly embossed into a reflecting metal layer, for example, or the relief structure is embossed in non-reflecting, embossable materials and is subsequently coated with a reflecting coating.

Figure 5:
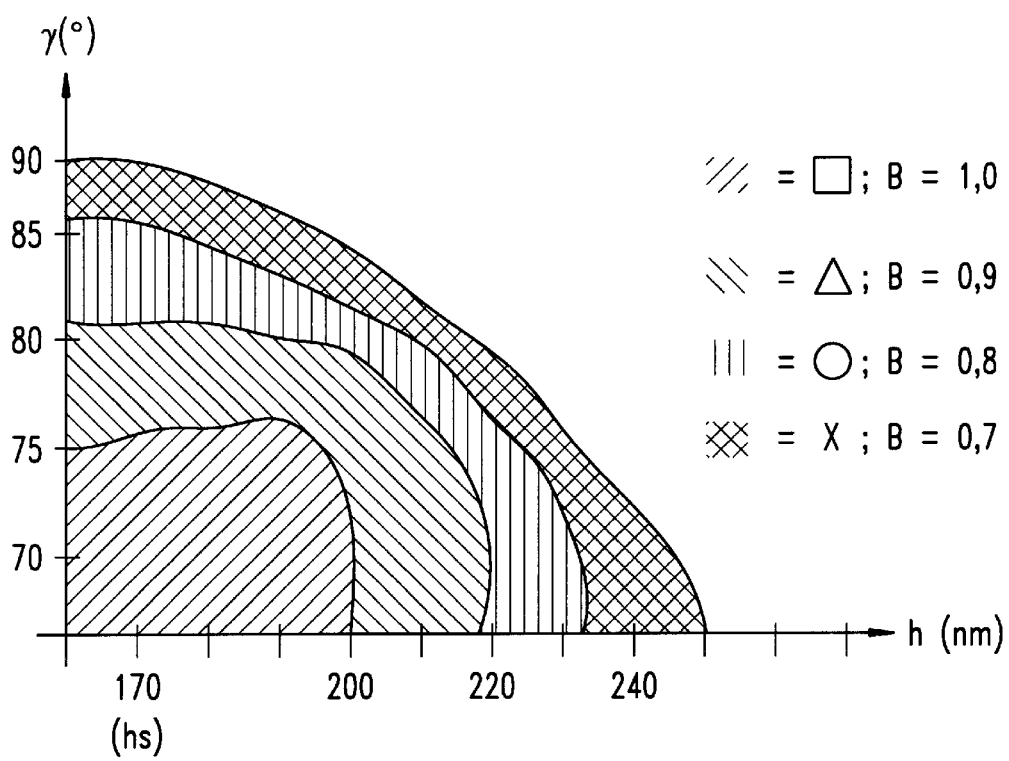
FIG. 5 is a graph of the flank angle as a function of the height of the bar structure of a scale for relative diffraction efficiencies.

FIG. 5 is a graph of the flank angle as a function of the height of the bar structure of a scale for relative diffraction efficiencies B. In particular, the diffraction efficiencies B plotted in FIG. 4, i.e., B=0.9, B=0.8 and B=0.7 are coded in FIG. 5. It can be seen from the graph of FIG. 5, that the tolerance for the height of the bars h in particular for a flank angle γ of less than 80°, is particularly large at high diffraction efficiency. With the position measuring system according to FIGS. 1 and 2, a required bar height hs=λ/4 theoretically results. If λ=670 nm, h therefore should be approximately 170 nm. In both cases the phase grating creates in the sum an optical wavelength difference of the impinging beams of λ/2. The experimentally determined conditions for the measuring system in accordance with FIG. 2 have been represented in FIG. 5 by way of example. The relative modulation degree of approximately 1 is attained up to a bar height of approximately 200 nm. Therefore the tolerance for the bar height h is relatively large.

Figure 6:
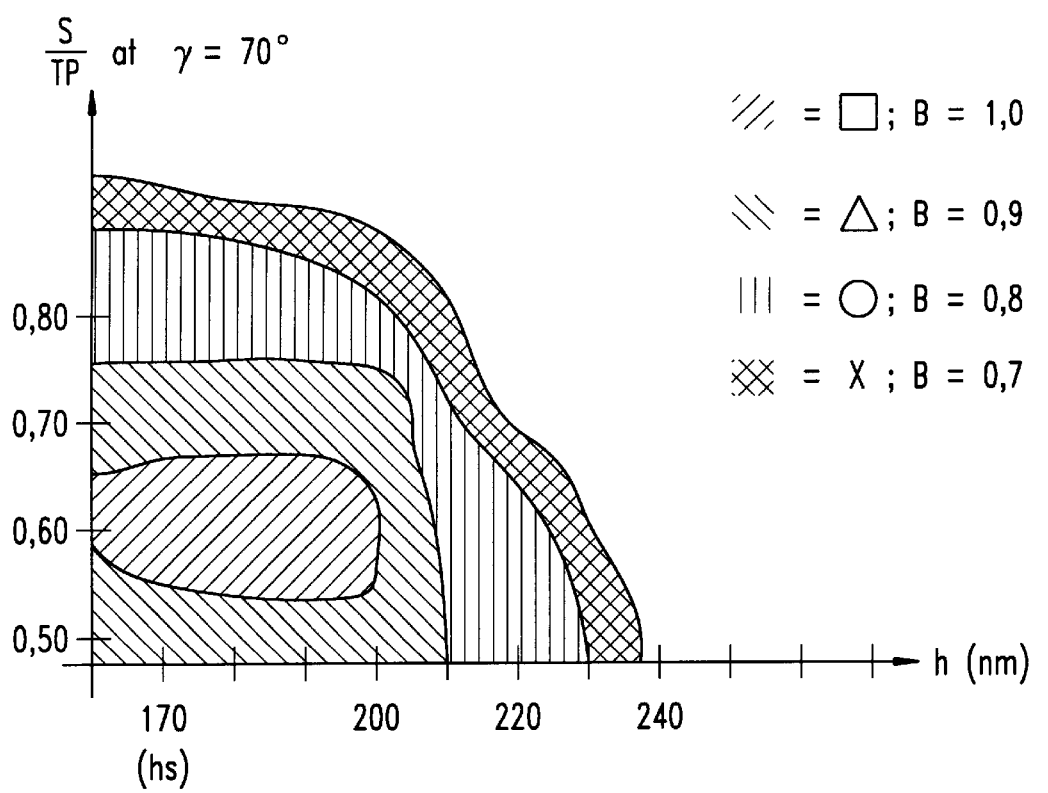
FIG. 6 is a graph of the ratio of bar width and graduation period as a function of the bar height for relative diffraction efficiencies.

FIG. 6 is a graph of the ratio of bar width and graduation period as a function of bar height for relative diffraction efficiencies. A function of the ratio of the bar width S and the graduation period TP (for example 512 nm) is plotted in FIG. 6 as a function of the bar height h at a flank angle γ=70° for the four relative diffraction efficiencies B=1, B=0.9, B=0.8 and B=0.7. In this case S defines the width of a bar 22 at the bottom of the gap 23, i.e., the bars widest portion. For improved understanding, the corresponding width L of the gap 23 is also drawn in FIG. 3, where TP=S+L. It can be seen from FIG. 6, that at a flank angle γ of approximately 70° the maximum diffraction efficiency B=1 can be achieved within a very large tolerance for S/TP of approximately 0.55 to 0.7 and the bar height h=160 to 200 nm. With a still good diffraction efficiency B=0.9, the possible range of S/TP even lies between 0.50 and 0.75, and the bar height h between 160 and 210 nm. FIG. 6 shows that with a flank angle γ of approximately 70° a still relatively high diffraction efficiency B is attained even with a ratio of S/TP=0.5. Such scales with S:L=1:1 can be relatively easily produced.

The relative diffraction efficiencies B were selected as comparison factor in FIGS. 4 to 6 because the absolute diffraction efficiency is a function of the material of the reflecting layer 26.

With the position measuring device according to the present invention, the diffraction efficiency B is very large for a relatively large area of incidence angle α. The permissible deviation from the Littrow angle α=sin λ/2TP is therefore very great and can differ by about ±4° which makes the assembly of the position measuring device easier.

The increase in the diffraction efficiency with a scale 2 embodied according to the present invention is particularly important if the reflecting surface 26 is made of chromium. Chromium per se has a smaller reflection degree than gold and titanium nitride (TiN). It would therefore be expected that the diffraction efficiency of a scale 2 coated with gold or TiN would be greater than that of a scale 2 coated with chromium. However, it has been shown that the diffraction efficiency of a scale 2 embodied according to the present invention, which is coated with chromium, is higher than that of a scale 2 coated with gold or TiN.

In our preferred example the scale 2 is embodied according to the present invention. In addition the scanning plate (beam splitter 12) and the scale as well as scanning plate alone can be embodied according to the present invention.

It is to be understood that the forms of the invention as described herewith are to be taken as preferred examples and that various changes in the shape, size and arrangement of parts may be resorted to without departing from the spirit of the invention or scope of the claims.

What is claimed is:

1. A position measuring device with a light source and a detector for measuring the position of two objects which are movable with respect to each other in a measuring direction, the device comprising:

a diffraction grating coupled to one object and formed by a reflecting relief structure having bars and gaps alternatingly arranged in the measuring direction and structured to increase the diffraction efficiency of the diffraction grating, and having a graduation period equal to or less than the wavelength of impinging beams from the light source wherein the bars have a trapezoidal shape with flank angles (γ) ranging from about 60° to about 80° with respect to the measuring direction.

2. The position measuring device according to claim 1, wherein the beams impinging on the diffraction grating are linearly polarized.

3. The position measuring device according to claim 2, wherein the polarization of the beams is oriented so that the electrically polarized portion of the beams lie in a plane of incidence, and with respect to the diffraction grating, this electrically polarized portion corresponds to the transverse magnetic mode oriented in the measuring direction.

4. The position measuring device according to claim 1, wherein the bars of the diffraction grating are formed of silicon.

5. The position measuring device according to claim 4 wherein the silicon is 110-silicon.

6. The position measuring device according to claim 4, wherein the diffraction grating is made of silicon, into which gaps have been etched, and whose reflecting surface is a layer of electrically conducting material.

7. The position measuring device according to claim 4, wherein the bars of the diffraction grating are coated by a reflecting surface.

8. The position measuring device according to claim 1 wherein the diffraction grating has a structure that causes several beams that impinge on the diffraction grating at an entry angle α=arc sin λ/2TP, to be diffracted into first diffraction orders, respectively, which exit the diffracting grating at an exit angle β=α, wherein TP is the graduation period of the diffraction grating.

9. A position measuring device according to claim 1 wherein the bars have flank angles of 70°.

10. The position measuring device according to claim 1, wherein the bars and gaps are structured to increase the diffraction efficiency of the first orders of diffraction generated by diffraction grating.

11. The position measuring device according to claim 1, wherein the gaps are trapezoidal in shape.

12. The position measuring device according to claim 1, wherein the bars of the diffraction grating are formed of silicon of a certain crystal orientation and the gaps are etched parallel with the crystal orientation.

13. The position measuring device according to claim 1, wherein the bars of the diffraction grating are formed of crystalline silicon and the gaps are formed by anisotropic etching of the crystalline silicon.

14. A position measuring device with a light source and a detector for measuring the position of two objects which are movable with respect to each other in a measuring direction, the device comprising:

a diffraction grating coupled to one object and formed by a reflecting relief structure having bars and gaps alternatingly arranged in the measuring direction and structured to increase the diffraction efficiency of the diffraction grating, and having a graduation period equal to or less than the wavelength of impinging beams from the light source wherein the bars have a trapezoidal shape with flank angles (γ) ranging from about 60° to about 80° with respect to the measuring direction; and wherein the reflecting relief structure of the diffraction grating comprises a reflecting surface made of an electrically conductive material.

15. The position measuring device of claim 14, wherein said electrically conductive material is not a dielectric material.

16. The position measuring device according to claim 14, wherein the reflecting surface of the diffraction grating is made of chromium.

17. A position measuring device with a light source and a detector for measuring the position of two objects which are movable with respect to each other in a measuring direction, the device comprising:

a diffraction grating coupled to one object and formed by a reflecting relief structure having bars and gaps alternatingly arranged in the measuring direction and structured to increase the diffraction efficiency of the diffraction grating, and having a graduation period equal to or less than the wavelength of impinging beams from the light source wherein the bars have a trapezoidal shape with flank angles (γ) ranging from about 60° to about 80° with respect to the measuring direction;

wherein the bars of the diffraction grating are formed of silicon coated by a reflecting surface; and wherein the reflecting relief structure is made of chromium.

18. The position measuring device according to claim 17 wherein the silicon is 110-silicon.

19. A position measuring device with a light source and a detector for measuring the position of two objects which are movable in relation to each other in a measuring direction, the device comprising:

a diffraction grating in the form of a reflecting relief grating with bars and gaps alternatingly arranged in the measuring direction and structured to increase the diffraction efficiency of the diffraction grating, the diffraction grating having a graduation period approximately equal to or less than the wavelength of an impinging light beam wherein the bars are approximately trapezoidal in shape having a flank angle of 70°±10°.

20. The position measuring device according to claim 19, wherein the bars and gaps are structured to increase the diffraction efficiency of the first orders of diffraction generated by diffraction grating.

21. The position measuring device according to claim 19, wherein the gaps are trapezoidal in shape.

* * * * *